Sept. 20, 1971  R. S. HECKROTTE  3,605,183
MIXING AND CASTING LACTAM COMPOSITIONS
Original Filed Dec. 8, 1966  2 Sheets-Sheet 1
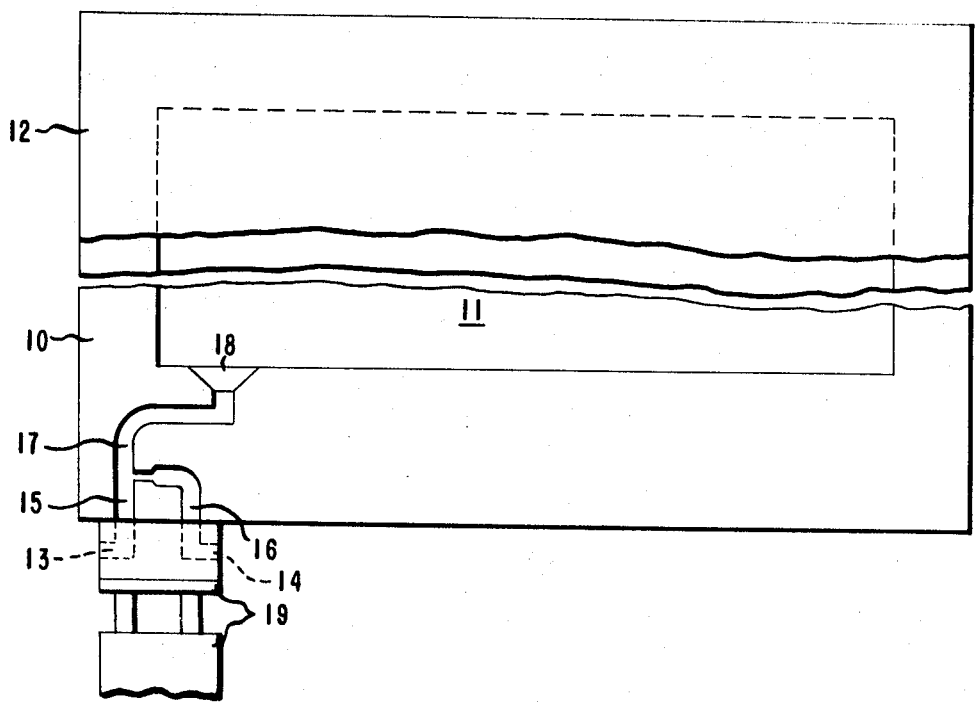
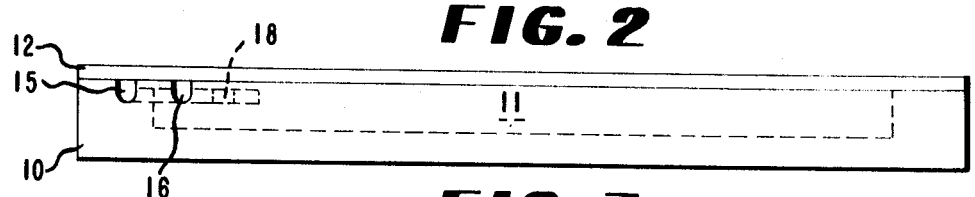
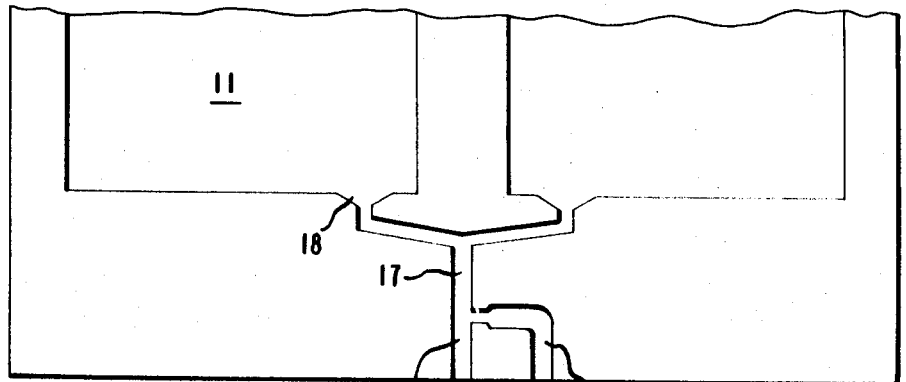
INVENTORS
ROBERT S. HECKROTTE
BY *James J. Flynn*
ATTORNEY

INVENTORS
ROBERT S. HECKROTTE

BY *James J. Flynn*
ATTORNEY

United States Patent Office 3,605,183
Patented Sept. 20, 1971

3,605,183
MIXING AND CASTING LACTAM COMPOSITIONS
Robert S. Heckrotte, Wilmington, Del., assignor to E. I. du Pont de Nemours and Company, Wilmington, Del.
Original application Dec. 8, 1966, Ser. No. 600,222, now Patent No. 3,494,999, dated Feb. 10, 1969. Divided and this application Feb. 12, 1969, Ser. No. 871,483
Int. Cl. B29b *1/06, 5/04;* B01f *5/04*
U.S. Cl. 18—5R    2 Claims

ABSTRACT OF THE DISCLOSURE

In casting molten monomeric lactams to form solid polylactam objects, separate streams of a catalyst-containing lactam composition and promoter-containing lactam composition, respectively, are forced through channels, one lactam stream being laterally introduced into the other at an angle of about 90° and with a mass-velocity about 2.5 to 3 times the mass-velocity of the other lactam stream. The resulting uniform mixture is passed to a mold cavity for polymerization and shaping, and upon completion the mold is opened and the solid article removed. In a multipart casting mold, one part is a mold block and the other a cover plate. Two separate channels in the mold block, which convey separate streams of lactam containing catalyst and lactam containing promoter, respectively, meet at an angle of about 90°, the cross section of the side-entering channel is of such a predetermined size that the mass-velocity of the monomer stream issuing out of said channel is 2.5 to 3 times the mass-velocity of the other monomer stream, and a common channel conveys the mixture to the mold cavity.

RELATED U.S. APPLICATION

This application is a division of application Ser. No. 600,222, filed Dec. 8, 1966, now Pat. No. 3,494,999.

BACKGROUND OF THE INVENTION

This invention relates to liquid monomer casting and, more particularly, to a process and apparatus for intimately mixing and casting anionically catalyzed and promoted lactam compositions.

In the rapid anionic polymerization of lactams to polylactams in which polymerization promoters, or co-catalysts, are used, great difficulty has been experienced in adequately mixing the heated molten ingredients without encountering appreciable polymerization before casting. A substantially uniform mixture of the polymerizable ingredients prior to polymerization is required in order to obtain high molecular weight cast polymers having substantially uniform properties. However, in the rapid anionic polymerization of lactams to polylactams, usually at elevated temperatures, polymerization is initiated almost instantaneously upon contact of the essential ingredients, i.e., lactam, anionic catalyst and polymerization promoter. For example, polymerization and solidification take place in many cases in less than 5 minutes after the ingredients are in contact with each other. In some cases, due to the presence of the polymerization promoter, polymerization is complete in a matter of several seconds to a few minutes. Therefore, it is imperative that the ingredients are substantially uniformly mixed rapidly, sometimes in a matter of several seconds, e.g. 20 to 60 seconds, before they are introduced into the mold cavity. The present invention provides a process that results in a substantially uniform mixture of the molten lactam composition before it is introduced into the mold cavity for shaping and polymerization. Furthermore, such mixing, prior to casting, must be accomplished effectively and efficiently each time the mold is charged. In apparatuses heretofore used, problems in removing scrap solids that remain in the channels of the mold and in minimizing the amount of such scrap material, which must be discarded as waste, have not been overcome with particular success. In addition, mixers employed in molding apparatuses heretofore known have been of such design as to entail considerable time and expense in their manufacture. Techniques used in an attempt to solve some of the problems mentioned above were, for example, providing a molding apparatus having a mixer wherein streams of resinous material and hardening agent in fluid form were delivered concurrently through a relatively long tortuous passage having frequent abrupt changes of direction whereby the fluids were thoroughly mixed before entering the mold cavity. Such an apparatus and procedure were not satisfactory for casting lactams prepared by rapid anionic polymerization techniques primarily because of (1) the generation of relatively large amounts of scrap material which form in the long tortuous passage of the mixer channel which is provided to obtain a uniform mixture, and (2) the high cost of machining the relatively long tortuous channels of such molding apparatus.

DESCRIPTION OF THE INVENTION

According to the present invention, a process is provided for casting monomeric lactam compositions which comprises:

(a) Forcing a stream of molten monomeric lactam containing an anionic catalyst and a separate stream of molten monomeric lactam containing a polymerization promoter into separate channels of a mixer, (b) Laterally introducing one lactam stream into the other lactam stream at an angle of about 90° and with a mass-velocity of said lateral stream about 2.5 to 3 times the mass-velocity of the other stream, thereby intimately mixing said streams, (c) Passing the combined streams that are substantially uniformly mixed to a mold cavity, and (d) Polymerizing the mixture in said mold cavity to a solid at a temperature below the melting point of the resulting polymer.

The solid polylactams made by the above process are cast in a predetermined shape in an apparatus which comprises a multipart mold, one part comprising a mold block and another a cover plate that is in abutting relationship thereto, means for supplying lactam compositions to a mixer, said mixer having separate first and second channels for conveying monomeric lactam compositions, wherein the second channel side-enters and communicates with the first channel at an angle of about 90°, the cross section of said second channel having at least its terminal portion of a predetermined size such that the mass-velocity of the lactam composition entering from said lateral channel is about from 2.5 to 3 times the mass-velocity of the other lactam composition stream, a common channel receiving the mixed lactam composition, and passage means connecting said common channel to a mold cavity.

In the accompanying drawings:

FIG. 1 is a plan view, partially in cut away section of a multipart mold apparatus of the invention, and attached thereto valved metering pumps, not a part of the invention, through which molten monomeric lactam compositions are supplied to the apparatus;

FIG. 2 is an end view of the mold apparatus of FIG. 1;

FIG. 3 is a plan view of a portion of a two-cavity molding apparatus constructed in accordance with this invention;

The invention can be more fully described by reference to the accompanying drawings wherein corresponding numbers are used for like parts throughout.

Figure 4:
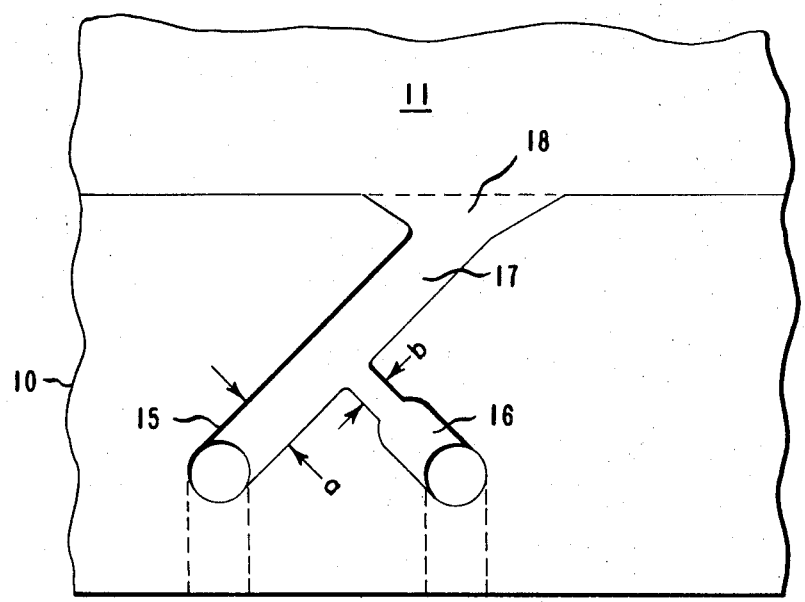
FIG. 4 is an enlarged plan view of the mixer portion of a modified mold apparatus constructed in accordance with this invention.

FIGS. 1 and 2 illustrate a molding apparatus comprising a mold block 10 having a base and side walls surrounding mold cavity 11 of any predetermined design. Cover plate 12 covers said cavity block, is held firmly in place by any suitable means, and serves to close mold cavity 11. Valved metering pumps 19, not a part of this invention, force molten monomer through ports 13 and 14 into the mixer portion of the mold apparatus which comprises a first channel 15 and a second channel 16. As illustrated, particularly in FIGS. 1 and 4, channel 16 side-enters channels 15 at substantially an angle of 90° thereto and the terminal portion of channel 16, as indicated at b—b is reduced to a predetermined size so that the mass-velocity of the monomer issuing therefrom is about 2.5 to 3 times the mass-velocity of the other monomer stream flowing through channel 15. Common channel 17 communicates with channels 15 and 16 and has a cross-sectional area, as indicated at a—a in FIGS. 1 and 4, that is substantially equivalent to that of channel 15. In general, the length of common channel 17 is at least about two times the major cross-sectional dimension of channel 15. Common channel 17 communicates with mold cavity 11 through gate 18.

In the operation of the apparatus, a first stream of molten lactam containing anionic catalyst and a second stream of molten lactam containing polymerization promoter are supplied by valved metering pumps 19, not a part of this invention, and forced through ports 13 and 14 to mixer channels 15 and 16, respectively. Sufficient pressure is applied on the molten lactam composition in channel 16, which may contain either lactam and anionic catalyst or lactam and polymerization promoter, to provide said stream with a mass-velocity about 2.5 to 3 times, and preferably 2.7 times, the mass-velocity of the molten lactam composition stream flowing through channel 15. The lactam stream in channel 16 is laterally introduced into the other lactam stream at an angle of about 90° at the required mass-velocity ratio. The terminal portion of channel 16 is reduced in size, as shown for example in FIG. 4, in order to assist in attaining the required mass-velocity. The intimately mixed lactam composition flows through common channel 17 which communicates with mold cavity 11 via gate 18. The uniform mixed polymerizable material is polymerized in the mold cavity to a solid at a temperature below about the melting point of the polylactam.

Another embodiment of the invention is shown in FIG. 3. In this embodiment twin-mold cavities 11 are shown in mold block 10, without cover plate 12, which also includes the mixed portion, comprising first channel 15, second side-entering channel 16, and common channel 17 communicating with gates 18 for the introduction of the mixed, catalyzed and promoted lactam composition into the mold cavities.

Figure 5:
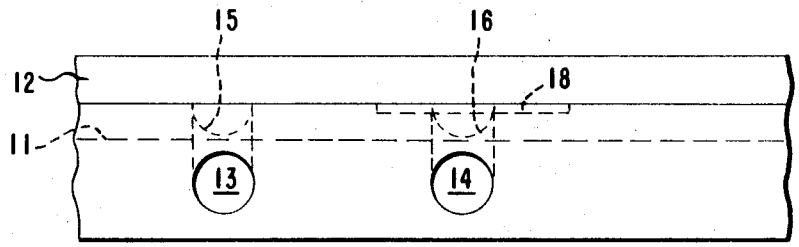
FIG. 5 is an end view of the apparatus of FIG. 4.

Still another embodiment is shown in FIGS. 4 and 5, which illustrate a device of the same general character as FIG. 1, wherein the arrangement of the mixer portions comprising channel 15, side-entering channel 16 and common channel 17 are modified. FIG. 5 represents an end view of the section of the apparatus of FIG. 4, and additionally includes cover plate 12 which closes channels 15, 16 and 17 shown in the plan view of FIG. 4.

As is evident from the above description and drawings, the mixer portion of the apparatus of this invention and the associated fluid delivery channels are located along a surface forming an interface between two or more relatively separable mold parts such that solidified material in the mixer, intermediate channels, and mold cavity can be removed upon separation of the parts of the mold after polymerization. Therefore, the associated delivery channels and mold cavity should be free of substantial undercuts which prevent separation of the mold parts.

A necessary feature of the invention is that the two monomeric lactam-containing streams must be brought together, one lactam stream being laterally introduced into the other lactam stream at certain mass-velocity ratios, thereby intimately mixing said streams. When the molten lactam streams from channel 15 and side-entering channel 16 are intimately mixed, the combined stream is passed a short distance along common channel 17 and then charged into the mold cavity at any point thereafter for shaping and polymerization. The ratio of the mass-velocity of the laterally-entering molten lactam stream is so proportioned at 2.5 to 3 times the mass-velocity of the other lactam stream that said laterally-entering stream penetrates and mixes with the other lactam stream without collecting along the wall of the channel opposite the side entrance.

The channels of the apparatus can be of any cross-sectional configuration provided that said channels are free of substantial undercuts that prevent removal of solidified polylactam from said channels and that interfere with opening the mold. The channels illustrated in the drawings are substantially of semicircular cross section, and this configuration is preferred. However, channels having, for example, circular cross sections may be employed, but construction of these requires that mating channels of substantially semicircular cross section be cut in both the mold block and cover therefor. Obviously, this increases the cost of construction and requires more precise alignment of the cover plate and mold block when casting polylactam articles than when a flat cover plate is employed. Channels 15, 16 and 17 of the mixer section of the molding apparatus illustrated, for example, in FIGS. 1 and 4 are shown in the mold block of the molding apparatus. Alternatively, said channels can be contained within a separable part of the molding apparatus which abuts the mold block and is clamped in proper alignment therewith. This arrangement may be desirable when the molding apparatus includes several mold cavities of different design, but having a similar mold volume, which may be used interchangedly with a common mixing section of the molding apparatus.

The casting process of this invention wherein the article is formed in the mold cavity is particularly effective in producing high molecular weight polylactams from lactams containing 3 to 12, and preferably 6 to 12, carbon atoms in the lactam ring. Such lactams include pyrrolidone, caprolactam, caprylolactam and laurolactam, or mixtures thereof. The polymerizable mixture is supplied to the mold cavity in the molten state. For caprolactam, which is the preferred species, this temperature is above about 69° C. and, preferably, the molten mixture entering the mold cavity is about 125° C. to 160° C.

The anionic catalyst, i.e. lactam-base salt, used in the process of the invention is prepared by the reaction of bases with a lactam. The base employed to form the anionic catalyst can be an alkali metal, an alkaline earth metal or basic derivative of one of these metals such as hydroxide, alkoxide or hydride. The polymerization promoter, i.e. cocatalyst, employed as any cocatalyst that is capable of promoting the polymerization of the lactam to a polylactam below its melting point. These cocatalysts can differ greatly in structure, and include various β-lactones such as 3-pentenoic acid β-lactone, various polycarbonates, organic isocyanates, and triazines.

The polymerization reaction is carried out above the melting point of the monomer and below the melting point of the resulting polylactam, generally, the polymerization temperature for caprolactam is from about 125° to 175° C., preferably about 150° C. Representative anionic catalysts, polymerization promoters and anionic polymerization conditions, including amounts of ingredients, that are applicable to the present invention are well known in the art and are described, for example, in U.S. Pats 3,017,301, 3,206,418 and 3,207,713.

Foamed compositions also may be formed by incorporating a foaming agent into either or both of the molten lactam casting fluids prior to mixing the separate streams and polymerizing the mixture. Any gas-generating foaming agent that decomposes or volatilizes below the polymerization reaction temperature can be used in the process of this invention. Representative preferred foaming agents are alkanes such as pentane and hexane, and allylic azides such as those described in U.S. Pat. 3,236,789.

If desired, various fillers such as calcium carbonate, carbon black, glass particles, etc., may be incorporated into either or both streams of the lactam casting fluids prior to mixing the streams that are conveyed to the mold cavity to be cast and polymerized into a predetermined shape.

The time for filling the mold cavity is limited by the gradually increasing viscosity of the catalyzed and promoted polymerizable composition and especially by the necessity for completely charging the mold cavity before the casting composition begins to solidify. Generally, following the rapid mixing process of this invention, the mold cavity is filled in less than about two minutes and preferably in 20 to 60 seconds with the uniformly mixed polymerizable material, although longer times are required for large castings. As shown for example in FIG. 4, channel 16 which communicates with channel 15 at an angle of about 90° has at least its terminal portion reduced to a predetermined size as shown at b—b in order to assist in attaining the mass-velocity ratio of the laterally introduced stream, of catalyst or lactam-containing polymerization promoter, at about from 2.5 to 3 times, and preferably about 2.7 times the mass-velocity ratio of the other lactam stream. If, for example, equal masses of monomeric solution pass through channels 15 and 16 of the mixer, then the mass-velocity ratio will be equivalent to the ratio of the velocities of two streams, and the cross section of channel 16 at b—b is chosen so that the velocity of said second stream is, for example, 2.7 times that of said first stream. The following table shows the velocities of fluid flow and the radii of semicircular channel 15 at a—a and channel 16 at b—b for specified deliveries of monomeric casting liquid through common channel 17 to mold cavity 11, assuming that equal masses of liquid are to enter through both channels 15 and 16, the mold filling time being 30 seconds, and the mass-velocity ratio of stream 16 to stream 15 is 2.7.

|  | Channel 15 at a—a | | Channel 16 at b—b | |
| --- | --- | --- | --- | --- |
|  | Radius, in. | Velocity, ft./sec. | Radius, in. | Velocity, ft./sec. |
| Weight of casting fluid to fill mold, pounds: | | | | |
| 6.5 | 0.16 | 5.4 | 0.09 | 14.6 |
| 4.0 | 0.13 | 6.3 | 0.08 | 17 |
| 4.0 | 0.14 | 4.8 | 0.09 | 12.95 |

Thus, with the knowledge of (1) the mass of casting fluid which is required to fill the mold cavity and (2) the desired mold-filling time, calculations according to generally known procedures permit construction of the fluid carrying channels that form the mixer and hence to complete a molding apparatus in which to conduct the process of the invention. Various factors such as viscosity, presence of fillers in casting fluids, available driving pressure or force per unit area on fluid streams, etc. which affect the velocity of the monomeric lactam fluids flowing through the channels may limit the range of channel cross-sectional areas which can be used with said casting compositions for trouble-free operation of the apparatus. Nevertheless, it is apparent that considerable latitude can be found in balancing factors controlling flow of a monomeric casting fluid so that the necessary requirements of the invention are achieved.

The following examples are illustrative of the invention.

EXAMPLE 1

A first molten caprolactam composition at a temperature of about 125° C., and containing per hundred moles of caprolactam 3.6 moles of anionic catalyst sodium caprolactam and 33% by weight calcium carbonate is fed at a flow rate of about 0.11 pound per second into side-entering channel 16. Simultaneously there is fed through channel 15 of the apparatus, at a rate of about 0.11 pound per second, a second molten caprolactam composition at a temperature of about 175° C. and containing per 100 parts by weight of caprolactam about 1.7 parts by weight of polymerization promoter poly[2,2-propane-bis(4-phenylcarbonate)], 0.6% by weight of foaming agent benzyl formate, and about 33% by weight of calcium carbonate filler. The two streams mix thoroughly at their point of contact in channel 17 and the laterally introduced stream has a mass-velocity ratio of 2.7 times the other lactam stream, and pass together at the rate of about 0.22 pound per second through gate 18 into mold cavity 11. The mold cavity is filled in about 30 seconds with the uniformly mixed lactam composition and polymerization is initiated at about 150° C. A rise in temperature due to the exothermic nature of the reaction and a leveling off of said temperature indicates polymerization has occurred. After about 5 minutes the shaped, foamed and filled polycaprolactam article is removed from the mold cavity. The small amount of solid waste polymer composition in channel 17 is readily removed, the mold is closed and ready for another casting operation.

EXAMPLE 2

The procedure described in Example 1 is repeated except that the first molten composition is made from 226 parts by weight caprolactam and 3 parts of a sodium hydride dispersion in mineral oil containing 50 weight percent of NaH. The second molten composition is made from 226 parts by weight laurolactam, 3.8 parts of the promoter diphenyl isophthalate and 1 part of the promoter poly[2,2-propane-bis(4-phenyl carbonate)]. The results are substantially the same as those obtained in Example 1.

EXAMPLE 3

The procedure described in Example 1 is repeated except the first molten composition is made from 226 parts by weight caprolactam, 3 parts of a sodium hydride dispersion in mineral oil containing 50 weight percent NaH. The second molten composition is made from 132 parts by weight caprylolactam, 94 parts by weight caprolactam and 3.8 parts of the promoter diphenyl isophthalate. The results obtained are substantially the same as those given in Example 1.

I claim:

1. An apparatus for rapidly mixing and casting lactam compositions in a predetermined shape which comprises a multipart mold one part comprising a mold block and another a cover plate that is in abutting relationship thereto, means for supplying molten lactam to a mixer, said mixer having separate first and second channels for introducing and conveying molten lactam monomer to a common channel wherein the second channel side-enters and communicates with the first channel at an angle of about 90°, said second channel having at least its terminal portion of a predetermined size such that the mass-velocity of the monomer entering from said lateral channel is about 2.5 to 3 times the mass-velocity of the other monomer stream, said common channel receiving the monomer mixture and passage means connecting said common channel to a mold cavity.

2. An apparatus according to claim 1 wherein the common channel has a cross-sectional area substantially equivalent to the first channel and a length at least two times the major cross-sectional dimension of said first channel.

References Cited

UNITED STATES PATENTS

| | | | |
|---|---|---|---|
| 2,645,463 | 7/1953 | Stearns | 259—4 |
| 2,862,239 | 12/1958 | Pollard et al. | 264—329X |
| 2,918,263 | 12/1959 | Eichhorn | 259—4 |
| 3,191,106 | 6/1965 | Baermann | 18—13(P)X |
| 3,223,761 | 12/1965 | Raley | 18—13(P)X |
| 3,339,240 | 9/1967 | Corbett | 264—329X |

J. SPENCER OVERHOLSER, Primary Examiner

R. L. SPICER, JR., Assistant Examiner

U.S. Cl. X.R.

18—13P; 259—18